(12) United States Patent
Ishii

(10) Patent No.: US 9,609,430 B2
(45) Date of Patent: Mar. 28, 2017

(54) TEMPERATURE MEASUREMENT APPARATUS AND PROTECTION APPARATUS FOR SOUND SIGNAL CONVERTING DEVICE

(71) Applicant: YAMAHA CORPORATION, Hamamatsu-shi (JP)

(72) Inventor: Jun Ishii, Hamamatsu (JP)

(73) Assignee: YAMAHA CORPORATION, Hamamatsu-shi (JP)

( * ) Notice: Subject to any disclaimer, the term of this patent is extended or adjusted under 35 U.S.C. 154(b) by 42 days.

(21) Appl. No.: 14/415,828

(22) PCT Filed: Jun. 24, 2013

(86) PCT No.: PCT/JP2013/067198
§ 371 (c)(1),
(2) Date: Jan. 20, 2015

(87) PCT Pub. No.: WO2014/013843
PCT Pub. Date: Jan. 23, 2014

(65) Prior Publication Data
US 2015/0181334 A1     Jun. 25, 2015

(30) Foreign Application Priority Data

Jul. 20, 2012  (JP) ................ 2012-161122

(51) Int. Cl.
*H03G 11/00*      (2006.01)
*H04R 3/00*       (2006.01)
(Continued)

(52) U.S. Cl.
CPC .............. *H04R 3/007* (2013.01); *G01K 7/16* (2013.01); *H04R 9/022* (2013.01);
(Continued)

(58) Field of Classification Search
USPC .... 381/26, 55, 71.11, 99, 185, 400, 406, 56, 381/57, 58, 96, 189, 401
See application file for complete search history.

(56) References Cited

U.S. PATENT DOCUMENTS

| 5,180,978 | A | * | 1/1993 | Postma | ............... G01V 3/101 324/207.16 |
| 7,113,603 | B1 | | 9/2006 | Cahill | |

(Continued)

FOREIGN PATENT DOCUMENTS

| EP | 2357726 A1 | 8/2011 |
| EP | 2899992 A1 | 7/2015 |

(Continued)

OTHER PUBLICATIONS

International Search Report issued in PCTJP2013067198, mailed Jul. 30, 2013. English translation provided.

(Continued)

*Primary Examiner* — Yosef K Laekemariam
(74) *Attorney, Agent, or Firm* — Rossi, Kimms & McDowell LLP

(57) ABSTRACT

An audio signal output from a tone generator is fed into a coil provided in a transducer for vibrating a sound board, so that a sound signal is generated by the vibration of the sound board. A predetermined DC voltage supplied by a constant voltage source circuit is superimposed on the audio signal by an adding circuit, so that the superimposed signal is fed into the coil. A current passing through the coil is sensed by a current sensing resistor, so that only a DC voltage component of a voltage signal on the both ends of the resistor is extracted by a low-pass filter circuit to be supplied to a microcomputer via an A/D converting circuit. The micro- (Continued)

computer figures out a resistance value and a temperature of the coil by use of the DC voltage component and the certain DC voltage value.

8 Claims, 3 Drawing Sheets

(51) Int. Cl.
*H04R 9/02* (2006.01)
*H04R 29/00* (2006.01)
*G01K 7/16* (2006.01)
*H04R 9/06* (2006.01)

(52) U.S. Cl.
CPC ....... *H04R 29/001* (2013.01); *G01K 2217/00* (2013.01); *H04R 9/06* (2013.01)

(56) References Cited

U.S. PATENT DOCUMENTS

| | | | |
|---|---|---|---|
| 9,014,384 B2 * | 4/2015 | Gautama | H03F 1/30 381/58 |
| 2002/0146135 A1 | 10/2002 | Howze | |
| 2015/0256931 A1 | 9/2015 | Ishii | |

FOREIGN PATENT DOCUMENTS

| | | | |
|---|---|---|---|
| GB | 1520156 A | | 8/1978 |
| JP | 63314127 A | | 12/1988 |
| JP | 592664 U | | 12/1993 |
| JP | 2004328954 A | | 11/2004 |
| JP | 2008292739 A | | 12/2008 |
| JP | 201043949 A | | 2/2010 |
| JP | 2010043949 | * | 2/2010 |

OTHER PUBLICATIONS

Written Opinion issued in PCTJP2013067198, mailed Jul. 30, 2013.
Extended European Search Report issued in EP13820162.9, mailed Jan. 28, 2016.
Henricksen, "Heat-Transfer Mechanisms in Loudspeakers: Analysis, Measurement, and Design", Journal of the Audio Engineering Society, Oct. 1, 1987, pp. 778-791, vol. 35, No. 10. XP-000796427.
Howard, "Hot Stuff: Loudspeaker Voice-Coil Temperatures", stereophile.com, Nov. 26, 2006, XP055243102, Retrieved on Jan. 20, 2016, http://www.stereophile.com/reference/1106hot/index.html#Ys9iwg3cwwUmwM12.97.
Buck, "Measuring Loudspeaker Voicecoil Temperature", AES, Presented at the 106th Convention, May 8-11, 1999, Munich, Germany. XP040371298.
Office Action issued in European Appln. No. 13820162.9, mailed Nov. 14, 2016.

* cited by examiner

TEMPERATURE MEASUREMENT APPARATUS AND PROTECTION APPARATUS FOR SOUND SIGNAL CONVERTING DEVICE

BACKGROUND OF THE INVENTION

Field of the Invention

The present invention relates to a temperature measurement apparatus for a sound signal converting device, the apparatus measuring temperature of a coil of the sound signal converting device. The invention also relates to a protection apparatus for the sound signal converting device, the apparatus having the temperature measurement apparatus and preventing rise in temperature of the coil in order to protect the sound signal converting device.

Description of the Related Art

Conventionally, as described in Japanese Unexamined Patent Publication No. 2008-292739, there is a keyboard musical instrument having a sound board, the instrument supplying an electric signal indicative of a musical tone generated by a tone generator in accordance with player's musical performance on a keyboard to a coil of a transducer which vibrates the sound board to vibrate the sound board in accordance with the electric signal indicative of the musical tone to generate a musical tone of a low tone volume.

Furthermore, Japanese Unexamined Patent Publication No. 2004-328954 discloses an apparatus which measures temperature of a coil of a motor for controlling automobile parts, and restricts driving of the motor in order to prevent burnout of the coil if the temperature of the coil has exceeded an acceptable value. For the coil temperature measurement, the voltage applied to the coil is detected, with the current passing through the coil being detected, so that the resistance value of the coil is calculated on the basis of the detected voltage and current to calculate the temperature of the coil in accordance with the calculated resistance value.

SUMMARY OF THE INVENTION

Problem to be Solved by Invention

However, the keyboard musical instrument having the sound board disclosed in the above-described Japanese Unexamined Patent Publication No. 2008-292739 is disadvantageous in that a large amount of current can be fed into the coil in order to vibrate the sound board, causing excessive rise in temperature of the coil due to the large amount of current to lead to abnormal conditions of the coil and its peripheral devices, and burnout of the coil and its peripheral devices.

In order to solve the disadvantage, the temperature of the coil can be detected to protect the coil and its peripheral device by use of the detected temperature. For the protection, the temperature of the coil can be measured by use of the art for measuring temperature of a coil disclosed in the above-described Japanese Unexamined Patent Publication No. 2004-328954. However, the temperature measurement art disclosed in the above-described Japanese Unexamined Patent Publication No. 2004-328954 is disadvantageous in that it is necessary to detect both the voltage applied to the coil and the current passing through the coil, resulting in a complicated circuit.

Means for Solving the Problem

The present invention was accomplished to solve the above-described problem, and an object thereof is to provide a temperature measurement apparatus for a sound signal converting device which converts an electric signal to a sound signal by energizing a coil, the apparatus being capable of measuring the temperature of the coil by a simple configuration. The object of the present invention is also to provide a protection apparatus for the sound signal converting device, the apparatus protecting the sound signal converting device and its peripheral devices by use of the measured temperature. In descriptions of constituent features of the present invention which will be described below, numerical references of corresponding components of embodiments which will be described later are given in parentheses in order to facilitate the understanding of the invention. However, it should not be understood that the constituent features of the invention are limited to the corresponding components of the embodiments indicated by the numerical references.

In order to achieve the above-described object, it is a feature in configuration of the first invention to provide a temperature measurement apparatus for a sound signal converting device (30, 38) having a coil (16) and converting an electric signal to a sound signal by energizing the coil (16), the apparatus measuring temperature of the coil (16), the apparatus including a constant voltage source circuit (21) connected to an input side of the coil (16) to apply a DC voltage having a predetermined voltage value to the coil (16); a current value extracting circuit (25, 26) connected to the coil (16) to extract a signal indicative of a value of direct current passing through the coil (16); and temperature obtaining unit (41 to 44) receiving the signal extracted by the current value extracting circuit (25, 26), and obtaining a temperature of the coil (16) by use of the predetermined voltage value. In this case, the predetermined voltage value is a small amount of voltage which does not affect sound signals converted by the sound signal converting device (30, 38), and can save power consumption. For example, it is preferable that the voltage value falls within a range of voltage values where a current from 10 mA to 100 mA is fed into the coil (16).

In this case, for example, the temperature obtaining unit (41 to 44) may be composed of resistance value calculating unit (41, 42) for calculating a resistance value of the coil (16) by use of the signal extracted by the current value extracting circuit (25, 26) and the predetermined voltage value; and temperature converting unit (43, 44) for converting the resistance value calculated by the resistance value calculating unit (41, 42) to a temperature of the coil (16). For example, furthermore, the current value extracting circuit (25, 26) may be composed of a resistor (25) for current sensing, the resistor being connected in series with the coil (16); and a low-pass filter circuit (26) connected at a position where the coil (16) is connected with the resistor (25).

As for the temperature measurement apparatus according to the first invention configured as above, the DC voltage is applied to the coil (16) by the constant voltage source circuit (21) to flow a direct current of an amount corresponding to the DC voltage into the coil (16), while a signal indicative of the direct current value passing through the coil (16) is extracted by the current value extracting circuit (25, 26). In this case, since the DC voltage applied to the coil (16) is predetermined, with the signal indicative of the value of the direct current passing through the coil (16) being extracted by the current value extracting circuit (25, 26), the resistance value of the coil (16) can be obtained. Furthermore, since there is a certain correlation between the resistance value and the temperature of the coil (16), the temperature obtaining unit (41 to 44) can obtain the temperature of the coil (16)

by using the signal extracted by the current value extracting circuit (25, 26) and the predetermined voltage value. According to the first invention, as described above, the sensing both of the voltage applied to the coil (16) and the current passing through the coil (16) is not necessary in order to obtain the temperature of the coil (16). More specifically, since only by providing the constant voltage source circuit (21), the current value extracting circuit (25, 26) and the temperature obtaining unit (41 to 44), the temperature of the coil (16) can be obtained by the temperature obtaining unit (41 to 44), the temperature measurement apparatus according to the first invention can measure the temperature of the coil (16) of the sound signal converting device (30, 38) by the simple configuration.

It is another feature of the first invention that the temperature measurement apparatus further includes a high-pass filter circuit (22) connected to the coil (16) such that the high-pass filter circuit is closer to an input side than a position at which the constant voltage source circuit (21) is connected to the coil (16), the high-pass filter circuit being provided in order to interrupt a DC component included in the electric signal which is to be input. According to the feature, even if an electric signal for generating a sound signal has a DC component, the high-pass filter circuit (22) can remove the DC component. Therefore, a DC voltage component which is to be applied to the coil (16) is composed only of the DC voltage supplied from the constant voltage source circuit (21), so that the temperature of the coil (16) obtained by the temperature obtaining unit (41 to 44) has no error to result in accurate temperature measurement for the coil (16).

Furthermore, it is a further feature of the first invention to provide a protection apparatus for a sound signal converting device, the protection apparatus having the temperature measurement apparatus configured as above, the protection apparatus further including protection unit (24, 45, 61, 62) for interrupting energization of the coil (16) for transmission of an electric signal or decreasing an amount of energization of the coil (16) for transmission of the electric signal if the temperature of the coil (16) obtained by the temperature obtaining unit (41 to 44) is equal to or greater than a predetermined temperature. This feature can avoid rise in temperature of the coil (16) caused by the energization of the coil (16). Resultantly, abnormal conditions and burnout of the sound signal converting device and its peripheral devices can be avoided, so that the sound signal converting device and its peripheral devices can be effectively protected.

In order to achieve the above-described object, furthermore, it is a feature in configuration of the second invention to provide a temperature measurement apparatus for a sound signal converting device (30, 38) having a coil (16) and converting an electric signal to a sound signal by energizing the coil (16), the apparatus measuring temperature of the coil, the apparatus including a constant current source circuit (52) connected to the coil (16) to feed a direct current having a predetermined current value to the coil; a voltage value extracting circuit (26) connected to the coil (16) to extract a signal indicative of a value of DC voltage applied to the coil (16); and temperature obtaining unit (47, 43, 44) receiving the signal extracted by the voltage value extracting circuit (26), and obtaining a temperature of the coil (16) by use of the predetermined current value. In this case, the predetermined current value is a small amount of current value which does not affect sound signals converted by the sound signal converting device (30, 38), and can save power consumption. For example, it is preferable that the current value falls within a range from 10 mA to 100 mA.

In this case, furthermore, the temperature obtaining unit (47, 43, 44) may be composed of resistance value calculating unit (47) for calculating a resistance value of the coil (16) by use of the signal extracted by the voltage value extracting circuit (26) and the predetermined current value; and temperature converting unit (43, 44) for converting the resistance value calculated by the resistance value calculating unit (47) to a temperature of the coil (16). Furthermore, the constant current source circuit (52) may be connected in parallel with the coil (16); and the voltage value extracting circuit (26) may be composed of a low-pass filter circuit (26) connected at a position where the constant current source circuit (52) is connected with the coil (16), for example.

As for the temperature measurement apparatus according to the second invention configured as above, a DC current is fed into the coil (16) by the constant current source circuit (52), so that a DC voltage of a magnitude corresponding to the DC current is generated in the coil (16), with a signal indicative of the DC voltage value generated in the coil (16) being extracted by the voltage value extracting circuit (26). In this case, the DC current passing through the coil (16) is predetermined, while the signal indicative of the DC voltage value generated in the coil (16) is extracted by the voltage value extracting circuit (26). Therefore, a resistance value of the coil (16) can be obtained. As described above, furthermore, since there is a certain correlation between the resistance value and the temperature of the coil (16), the temperature obtaining unit (47, 43, 44) can obtain the temperature of the coil (16) by using the signal extracted by the voltage value extracting circuit (26) and the predetermined current value. According to the second invention, as described above, the sensing both of the voltage applied to the coil (16) and the current passing through the coil (16) is not necessary in order to obtain the temperature of the coil (16). More specifically, since only by providing the constant current source circuit (52), the voltage value extracting circuit (26) and the temperature obtaining unit (47, 43, 44), the temperature of the coil (16) can be obtained by the temperature obtaining unit (47, 43, 44), the temperature measurement apparatus according to the second invention can measure the temperature of the coil (16) of the sound signal converting device (30, 38) by the simple configuration.

Furthermore, it is another feature of the second invention that the temperature measurement apparatus further includes a high-pass filter circuit (51) connected to an input side of the coil (16) to interrupt a DC component included in the electric signal which is to be input. According to the feature, even if an electric signal for generating a sound signal has a DC component, the high-pass filter circuit (51) can remove the DC component. Therefore, a direct current component which is to be applied to the coil (16) is composed only of the direct current supplied from the constant current source circuit (52), so that the temperature of the coil (16) obtained by the temperature obtaining unit (41 to 44) has no error to result in accurate temperature measurement for the coil (16).

Furthermore, it is a further feature of the second invention to provide a protection apparatus for the sound signal converting device, the protection apparatus having the temperature measurement apparatus configured as above, the protection apparatus further including protection unit (24, 45, 63, 64) for interrupting energization of the coil (16) for transmission of an electric signal or decreasing an amount of energization of the coil (16) for transmission of the electric signal if the temperature of the coil (16) obtained by the temperature obtaining unit (47, 43, 44) is equal to or greater than a predetermined temperature. This feature can avoid rise in temperature of the coil (16) caused by the energization of the coil (16). Resultantly, abnormal conditions and burnout of the sound signal converting device and its peripheral devices can be avoided, so that the sound signal converting device and its peripheral devices can be effectively protected.

DESCRIPTION OF THE PREFERRED EMBODIMENT a. First Embodiment

Figure 1:
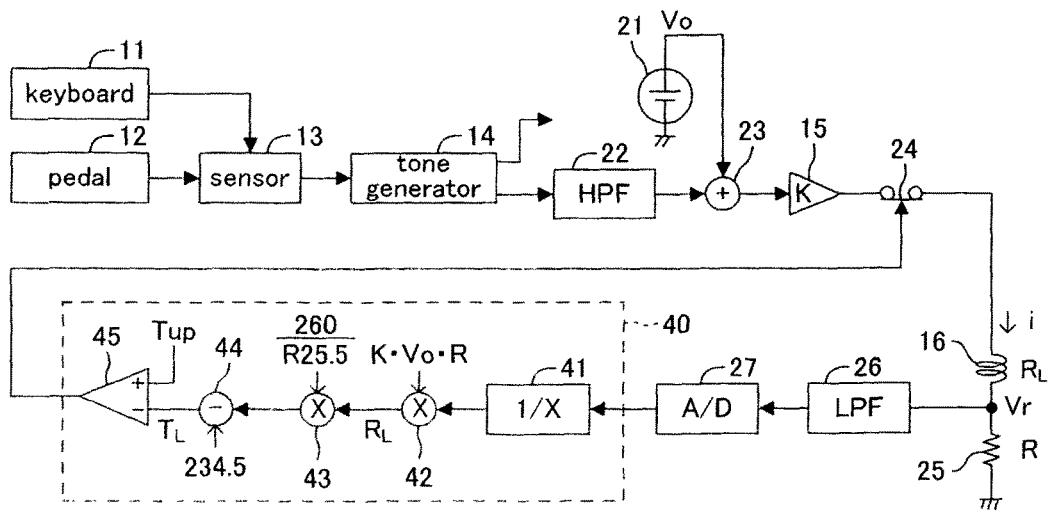
FIG. 1 is a schematic block diagram showing an electronic circuit embedded in a piano in order to vibrate a sound board according to the first embodiment of the present invention.

A piano according to the first embodiment of the present invention will now be explained. This piano, which drives a hammer via an action mechanism in accordance with a depression and release of a key of a keyboard to make the hammer strike strings to generate a piano tone, has a function of controlling driving of a transducer by an electric signal so that a sound board can be driven by the transducer to generate a softened tone. Hereafter, a part for generating a softened tone will be explained in detail, the part being directly related to the present invention. FIG. 1 is a schematic block diagram showing an electronic circuit embedded in the piano to vibrate the sound board in order to generate softened piano tones or softened tones of a different musical instrument.

The piano has a keyboard 11 and a pedal 12. The keyboard 11 is composed of a plurality of white keys and a plurality of black keys to serve as musical performance means operated by player's hands to depress or release the keys. The pedal 12 is composed of a damper pedal, a soft pedal and the like to serve as musical performance means operated by a player's foot.

Furthermore, the piano has a sensor circuit 13, a tone generator 14, an amplifier circuit 15 and a coil 16 in order to generate softened musical tones. The sensor circuit 13 is formed of a plurality of sensors for sensing the position of a depressed key and the velocity of a key-depression on the keyboard 11, the position and the velocity of a traveling hammer which is not shown but is driven by a player's key-depression on the keyboard 11, and the position of the pedal 12 operated by the player.

In accordance with the position and the velocity of the key-depression on the keyboard 11, the position and the velocity of the traveled hammer, and the position of the operated pedal 12 sensed by the sensor circuit 13, the tone generator 14 outputs a musical tone signal having a tone pitch corresponding to the key depressed on the keyboard 11 in a tone volume corresponding to the velocity of the key-depression in accordance with player's operation on the pedal 12. Normally, musical tone signals output by the tone generator 14 are audio signals (electric signals) corresponding to piano tones, but can be audio signals (electric signals) corresponding to musical tones of a musical instrument other than piano. The audio signal output by the tone generator 14 is output to the amplifier circuit 15 via a high-pass filter 22 and an adding circuit 23 which will be described in detail later. In the figure, although the tone generator 14 is designed to output a different audio signal as well, the different audio signal is to be used for a different channel and to be output to a circuit device similar to a circuit device which will be explained below. For simplicity's sake, however, the destination to which the audio signal for the different channel will be output is not shown in the figure. Furthermore, the audio signal output by the tone generator 14 can be supplied not only to the high-pass filter circuit 22 but also to headphones, a different audio apparatus and the like.

The amplifier circuit 15 amplifies the input audio signal (actually, the audio signal on which a later-described offset voltage Vo has been superimposed) with a predetermined amplification factor K, and outputs the amplified signal to one end of the coil 16 via a relay circuit 24 which will be described in detail later. The coil 16 is provided inside the transducer 30, with the other end of the coil 16 being grounded via a resistor 25 which will be described in detail later. As a result, by the output of the audio signal from the tone generator 14, a current corresponding to the audio signal is fed into the coil 16.

Figure 2:
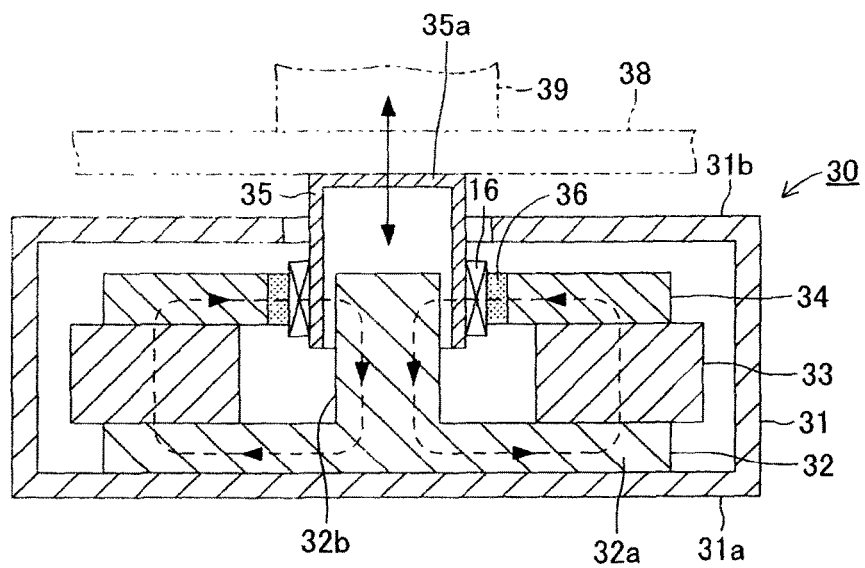
FIG. 2 is a horizontal section view of a transducer which vibrates the sound board.

The transducer 30 has a bottom surface 31a and an upper surface 31b to have a box 31 having a cylindrical space thereinside, as indicated in the horizontal section view of FIG. 2. The box 31 is fastened to a supporting column of the piano at the bottom surface 31a, and has a circular through hole at the center of the upper surface 31b. In the box 31, furthermore, a yoke 32, a magnet 33 and a yoke 34 are housed. The yoke 32 has a disc portion 32a shaped like a disc and a cylinder portion 32b which protrudes upward from a central position of the disc portion 32a and is shaped like a cylinder, with undersurface of the disc portion 32a being fastened to a bottom surface of the box 31. The magnet 33 is shaped like a cylinder, with the bottom surface of the magnet 33 being fastened to the disc portion 32a of the yoke 32. Furthermore, the cylinder portion 32b of the yoke 32 is pierced through the through hole provided at the central position. The yoke 34 is also shaped like a cylinder. More specifically, a bottom surface of the yoke 34 is fastened to the magnet 33, while the cylinder portion 32b of the yoke 32 is pierced through a through hole provided at the center of the yoke 34. As a result, magnetic paths are provided as indicated by broken lines in the figure.

The transducer 30 also has a driving member 35 and the above-described coil 16. The driving member 35 vibrates the sound board 38 of the piano and a bridge 39 which supports strings which are not shown, and has an upper surface 35a for closing the upper surface, with the undersurface of the driving member 35 being open to be shaped like a cylinder. The upper surface 35a of the driving member 35 is bonded to the undersurface of the sound board 38 with an adhesive, double-faced tape or the like such that the driving member 35 is situated immediately below or near the bridge 39 which supports strings which are not shown. Furthermore, the driving member 35 is pierced through the through hole of the upper surface 31b of the box 31, so that the lower part of the driving member 35 is inserted into a space provided between the outer periphery of the cylinder portion 32b of the yoke 32 and the inner periphery of the yoke 34. The coil 16 is coiled around the outer periphery of the driving member 35 to be situated on the magnetic path shown by the broken lines in the figure. Between the outer periphery of the coil 16 and the inner periphery of the yoke 34, a magnetic fluid 36 is interposed.

By this configuration, if a current corresponding to an audio signal is fed through the coil 16, the coil 16 and the driving member 35 vibrate in a vertical direction shown in the figure to vibrate the sound board 38 and the bridge 39 in accordance with the audio signal, so that a sound signal corresponding to the audio signal is generated by the vibration of the sound board 38. Therefore, the transducer 30 and the sound board 38 serve as a sound signal converting device for converting an audio signal, that is, an electric signal to a sound signal.

FIG. 1 will be explained again. In order to measure the temperature of the coil 16 and to protect the transducer 30 including the coil 16 and its peripheral devices, the piano has a constant voltage source circuit 21, the high-pass filter circuit 22, the adding circuit 23, the relay circuit 24, the resistor 25, a low-pass filter circuit 26, an A/D converting circuit 27, and a microcomputer 40.

In order to detect the resistance value of the coil 16, the constant voltage source circuit 21 outputs a predetermined magnitude of DC voltage Vo which is to be superimposed on an audio signal. The DC voltage Vo is small enough to have no effect on reproduction of audio signals and to save power consumption. More specifically, it is preferable that the DC voltage Vo falls within a range of voltage values where a current from 10 mA to 100 mA, for example, is fed through the coil 16. Furthermore, it is preferable that the constant voltage source circuit 21 is placed at a position as far as possible from the coil 16 which is a heat source in order to prevent the DC voltage Vo which is to be output from fluctuating due to influence of temperature. The high-pass filter circuit 22 is connected with the output of the tone generator 14 in order to reliably remove DC component from an audio signal output by the tone generator 14 so that the DC voltage passing through the coil 16 depends only on the DC voltage Vo supplied from the constant voltage source circuit 21. The adding circuit 23 adds the DC voltage Vo supplied from the constant voltage source circuit 21 to the audio signal supplied from the tone generator 14 as offset voltage, and outputs the resultant to the amplifier circuit 15. The relay circuit 24 is provided between the amplifier circuit 15 and the coil 16 to serve as a relay switch which is controlled by the microcomputer 40 to switch between on and off in order to switch between energization and non-energization of the coil 16.

The resistor 25 is provided between the coil 16 and a ground to serve as a current sensing resistor (shunt resistor) for sensing a direct current "I" running through the coil 16. A resistance value R of the resistor 25 is a predetermined value which is small enough to be ignored, compared to a resistance value $R_L$ of the coil 16. The low-pass filter circuit 26 removes alternating current signal component, that is, an audio signal from a voltage signal applied to the resistor 25, and outputs only DC voltage component to the A/D converting circuit 27. The A/D converting circuit 27 converts the DC voltage component output from the low-pass filter circuit 26 from analog to digital, and outputs the converted component to the microcomputer 40. In FIG. 1, the magnitude of the DC voltage component is represented as a voltage value Vr at the coil side of the resistor 25.

The microcomputer 40 is composed of a CPU, a ROM, a RAM and the like. By program processing, furthermore, the microcomputer 40 calculates the resistance $R_L$ and a temperature $T_L$ of the coil 16 on the basis of the voltage value Vr input from the A/D converting circuit 27, and controls to switch the relay circuit 24 between on and off by use of the calculated temperature $T_L$.

The program processing will now be explained. FIG. 1 indicates a functional block diagram of the microcomputer 40 to show the content of the program processing. A reciprocal transforming portion (1/x) 41 calculates the reciprocal of the voltage value Vr input from the A/D converting circuit 27, and outputs the reciprocal value 1/Vr to a multiplier 42. The multiplier 42 multiplies the input value 1/Vr supplied from the reciprocal transforming portion 41 by a predetermined value K·Vo·R, and outputs the multiplied value K·Vo·R/Vr to a multiplier 43. The value K is a predetermined amplification factor of the amplifier circuit 15. The value Vo is a predetermined DC voltage value output from the constant voltage source circuit 21. The value R is a predetermined resistance value of the resistor 25.

The multiplier 43 multiplies the value K·Vo·R/Vr input from the multiplier 42 by a value 260/R25.5, and outputs the multiplied value 260·K·Vo·R/Vr·R25.5 to a subtracting portion 44. The subtracting portion 44 subtracts a value 234.5 from the value 260·K·Vo·R/Vr·R25.5 input from the multiplier 43, and outputs the subtracted value 260·K·Vo·R/Vr·R25.5-234.5 to a comparison portion 45. The value 260/R25.5 and the value 234.5 will be described in detail later. The comparison portion 45 compares the value 260·K·Vo·R/Vr·R25.5-234.5 input from the subtracting portion 44 with a predetermined upper limit temperature $T_{up}$. If the input value 260·K·Vo·R/Vr·R25.5-234.5 is smaller than the upper limit temperature $T_{up}$, the comparison portion 45 controls the relay circuit 24 to be an on-state. If the input value 260·K·Vo·R/Vr·R25.5-234.5 is equal to or greater than the upper limit temperature $T_{up}$, the comparison portion 45 controls the relay circuit 24 to be an off-state. The upper limit temperature $T_{up}$ is a temperature of a case where the temperature of the coil 16 has risen so excessively that abnormal conditions, burnout or the like on the coil 16 and its peripheral devices can arise.

Next, behavior of the piano according to the first embodiment configured as above will be explained. When a player operates the keyboard 11 and the pedal 12 for musical performance, the operation of keyboard 11 and the pedal 12 is sensed by the sensor circuit 13, so that a sensing signal representative of the musical performance sensed by the sensor circuit 13 is supplied to the tone generator 14. In accordance with the sensing signal representative of the musical performance, the tone generator 14 outputs an electrical musical tone signal (audio signal) representative of a piano tone to the high-pass filter circuit 22. In a case where a musical instrument tone other than piano tone has been selected by the player's manipulation of a tone color selection switch which is not shown, an electrical musical tone signal (audio signal) representative of the player's selected musical instrument tone is output to the high-pass filter circuit 22.

The high-pass filter circuit 22 removes a DC component included in the audio signal, and supplies only an alternating component to one input of the adding circuit 23. To the other input of the adding circuit 23, the predetermined DC voltage Vo is supplied from the constant voltage source circuit 21, so that the adding circuit 23 supplies an electric signal obtained by superimposing the DC voltage Vo on the audio signal to the amplifier circuit 15. The amplifier circuit 15 amplifies the supplied signal with the amplification factor K, and supplies the amplified signal to the relay circuit 24. The relay circuit 24 designed to be controlled to be in the off-state if the temperature $T_L$ of the coil 16 is equal to or greater than the predetermined upper limit temperature $T_{up}$ is programmed to be in the on-state at its initial state at least, as described in detail later. Therefore, the voltage signal obtained by superimposing the audio signal on the DC voltage Vo and amplifying the signal with the amplification factor K is supplied through the relay circuit 24 to the coil 16 and the resistor 25 which are connected in series.

By this voltage signal, a current of the magnitude proportional to the voltage signal is fed through the coil 16 and the resistor 25. By the current passing through the coil 16, the transducer 30 vibrates the driving member 35, so that the sound board 38 and the bridge 39 also vibrate in response to the vibration of the driving member 35. In this case, since the DC voltage Vo is designed to be a small amount of voltage that will not affect reproduction of the audio signal, the sound board 38 and the bridge 39 vibrate in response to the audio signal output from the tone generator 14 to pass through the high-pass filter circuit 22. By the vibration of the sound board 38, the audio signal is converted to a sound signal, so that the player and audience can hear a musical tone corresponding to the player's operation on the keyboard 11 and the pedal 12. The musical tone brought about by the vibration of the sound board 38 by use of the transducer 30 is a musical instrument tone of a low tone volume, compared to a case where strings are vibrated by a hammer. That is, the musical tone is a softened tone of the musical instrument.

Next, the sensing of the resistance value $R_L$ and the temperature $T_L$ of the coil 16 will be explained. As described above, the resistance value R of the resistor 25 is so small, compared with the resistance $R_L$ of the coil 16, that the resistance value R can be ignored. Therefore, the magnitude "I" of the current flowing through the coil 16 and the resistor 25 is equal to a value obtained by multiplying a value obtained by adding the DC voltage Vo to the audio signal by the amplification factor K and dividing the multiplied result by the resistance value $R_L$ of the coil 16. Furthermore, since the AC component, that is, the audio signal component is removed from the voltage signal on the both ends of the resistor 25 by the low-pass filter circuit 26 to be supplied to the A/D converting circuit 27, the voltage Vr on the both ends of the resistor 25 resulting only from the DC voltage Vo is supplied to the A/D converting circuit 27. The voltage Vr is then converted from analog to digital by the A/D converting circuit 27 to be supplied to the microcomputer 40.

Next, the principle of sensing of the resistance value $R_L$ of the coil 16 will be explained. As described above, the resistance value R of the resistor 25 is so small, compared with the resistance value $R_L$ of the coil 16, that the resistance value R of the resistor 25 can be ignored. Excluding the audio signal (AC component), if the current value flowing through the coil 16 by the DC voltage Vo is "i", the resistance value $R_L$ of the coil 16 can be expressed as an equation 1 given below, for the DC voltage Vo is amplified with the amplification factor K.

$$R_L = K \cdot Vo/i \qquad \text{equation 1}$$

The current value "I" can be expressed as an equation 2 given below, using the voltage Vr on the both ends of the resistor 25 (voltage from which the AC component has been removed) and the current "I". In this sense, the resistor 25 is a current sensing resistor.

$$i = Vr/R \qquad \text{equation 2}$$

If the current value "I" expressed by the equation 2 is substituted into the equation 1, the resistance value $R_L$ of the coil 16 can be expressed as equation 3 given below.

$$R_L = K \cdot Vo \cdot R/Vr \qquad \text{equation 3}$$

The behavior of the circuit of FIG. 1 will be explained again. The voltage value Vr converted from analog to digital by the A/D converting circuit 27 and supplied to the microcomputer 40 is transformed to a reciprocal by the reciprocal transforming portion 41 to be the value 1/Vr to be multiplied by the value K·Vo·R by the multiplier 42. As a result, the value output from the multiplier 42 is the value K·Vo·R/Vr expressed by the equation 3 representing the resistance value $R_L$ of the coil 16. By the equation, the resistance value $R_L$ of the coil 16 can be obtained.

Next, the calculation of the temperature $T_L$ of the coil 16 by use of the resistance value $R_L$ of the coil 16 will be explained. Employing a conventionally known method of measuring an average temperature by a resistance method using temperature coefficient of resistance of copper, an equation for the resistance method can be expressed by an equation 4 given below.

$$R2/R1 = (234.5 + T2)/(234.5 + T1) \qquad \text{equation 4}$$

In the equation 4, "T1" represents the temperature before energization of the coil 16, "R1" represents the resistance value before energization of the coil 16, "T2" represents the temperature after energization of the coil 16, and "R2" represents the resistance value after energization of the coil 16.

If the equation 4 is transformed, the temperature T2 can be expressed by an equation 5 given below.

$$T2 = R2 \cdot (234.5 + T1)/R1 - 234.5 \qquad \text{equation 5}$$

On the assumption that the temperature T1 before energization of the coil 16 is 25.5 degrees Celsius, the resistance value R1 of the coil 16 at this temperature T1 (=25.5) is measured. Assuming that the resistance value R1 is a value R25.5, the equation 5 can be expressed as an equation 6 given below.

$$T2 = 260 \cdot R2/R25.5 - 234.5 \qquad \text{equation 6}$$

Therefore, by substituting the calculated resistance value $R_L$ of the coil 16 into the resistance value R2 of the equation 6, the temperature $T_L$ of the coil 16 can be figured out.

The behavior of the circuit shown in FIG. 1 will be explained again. The resistance value $R_L$ of the coil 16 calculated by the multiplier 42 is multiplied by the value 260/R25.5 at the multiplier 43, while the value 234.5 is subtracted from the multiplied result 260·$R_L$/R25.5 at the subtracting portion 44. As a result, the temperature $T_L$ of the coil 16 can be obtained.

The obtained temperature $T_L$ (=260·K·Vo·R/Vr·R25.5−234.5) of the coil 16 is compared with the predetermined upper limit temperature $T_{up}$ at the comparison portion 45. If the temperature $T_L$ of the coil 16 is smaller than the upper limit temperature $T_{up}$, the relay circuit 24 is controlled to be the on-state. In this case, therefore, by the transducer 30 driven by the audio signal, a musical tone brought about by the vibration of the sound board 38 is generated. If the temperature $T_L$ of the coil 16 is equal to or greater than the upper limit temperature $T_{up}$, the relay circuit 24 is controlled to be the off-state. Resultantly, a path through which signals are input to the coil 16 is interrupted, so that no electric signals will be fed into the coil 16 to stop the generation of the musical tone.

As explained above, the first embodiment is designed such that the DC component included in the audio signal supplied from the tone generator 14 is removed by the high-pass filter circuit 22, while the DC voltage Vo which is an offset signal and is supplied from the constant voltage source circuit 21 is superimposed on the audio signal from which the DC component has been removed, before the current is fed into the coil 16 of the transducer 30 via the relay circuit 24. In this case, since the DC voltage Vo which is direct does not affect reproduction of an audio signal, and is low in order to save power consumption, the DC voltage Vo does not affect vibration of the sound board 38. Therefore, a preferable musical tone brought about by vibration of the sound board 38 can be generated in a softened tone.

The magnitude of the current passing through the coil 16 is sensed by the resistor 25 for current-sensing, so that the voltage signal representative of the magnitude of the current is supplied to the microcomputer 40 via the low-pass filter circuit 26 and the A/D converting circuit 27. In this case, since the low-pass filter circuit 26 removes AC component (audio signal component) from the voltage signal, the current "I" passing through the coil 16 only by the DC voltage Vo output from the constant voltage source circuit 21 is sensed, so that a voltage signal Vr ($=R \cdot i = K \cdot Vo \cdot R/R_L$) representative of the current "I" is supplied to the microcomputer 40. The microcomputer 40 figures out the resistance value $R_L$ and the temperature $T_L$ of the coil 16 from the input voltage value in accordance with the processing done by the reciprocal transforming portion 41, the multipliers 42 and 43, and the subtracting portion 44. According to the first embodiment, as a result, the resistance value $R_L$ and the temperature $T_L$ of the coil 16 can be accurately measured by the simple configuration while musical tones are kept being generated.

According to the first embodiment, furthermore, by use of the measured temperature $T_L$ of the coil 16, the relay circuit 24 is controlled to switch between the on-state and the off-state to avoid excessive rise in the temperature $T_L$ of the coil 16. In a case where there is a tendency of the temperature $T_L$ of the coil 16 to rise excessively, therefore, energization of the coil 16 is canceled to avoid rise in the temperature caused by the energization of the coil 16. Resultantly, abnormal conditions of the coil 16 and its peripheral devices, and burnout of the coil 16 and its peripheral devices can be avoided, so that the piano according to the first embodiment can be effectively protected. Therefore, the relay circuit 24 serves as protecting means for protecting the coil 16 and its peripheral devices.

b. Second Embodiment

Figure 3:
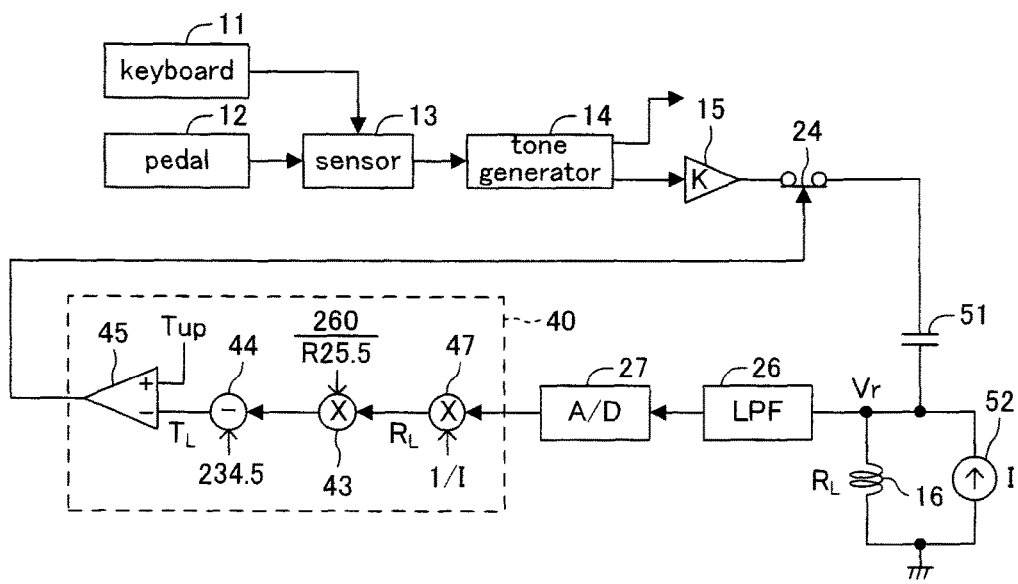
FIG. 3 is a schematic block diagram showing an electronic circuit embedded in a piano in order to vibrate a sound board according to the second embodiment of the invention.

Next, a piano according to the second embodiment of the present invention will be explained. FIG. 3 is a schematic block diagram indicative of an electronic circuit embedded in the piano to vibrate the sound board in order to generate softened piano tones or softened tones of a different musical instrument on the piano according to the second embodiment.

Similarly to the piano of the first embodiment, this piano also has the keyboard 11, the pedal 12, the sensor circuit 13, the tone generator 14, the amplifier circuit 15 and the coil 16 in order to generate softened musical tones. In addition to the keyboard 11, the pedal 12, the sensor circuit 13, the tone generator 14, the amplifier circuit 15 and the coil 16, the above-described transducer 30 is completely identical to that of the first embodiment. Therefore, these components are provided with the same numerical references as those of the first embodiment to omit explanation about the components.

In order to sense the resistance value $R_L$ and the temperature $T_L$ of the coil 16, this piano has a capacitor 51 and a constant current source circuit 52 instead of the constant voltage source circuit 21, the adding circuit 23, and the resistor 25 of the first embodiment. The capacitor 51 removes DC component from an audio signal supplied to the coil 16 from the tone generator 14 via the amplifier 15 and the relay circuit 24, and prevents direct current supplied from the constant current source circuit 52 from flowing into the relay circuit 24 side. In other words, the capacitor 51 serves as a high-pass filter circuit which has a function almost the same as the high-pass filter circuit 22 of the first embodiment. The constant current source circuit 52 is connected with the coil 16 in parallel to output a predetermined direct current "I" which is to be superimposed on an audio signal. The direct current "I" does not also affect reproduction of the audio signal, and is small enough to save power consumption. More specifically, it is preferable that the direct current "I" falls within a range from 10 mA to 100 mA. Furthermore, it is preferable that the constant current source circuit 52 is placed at a position as far as possible from the coil 16 which is a heat source in order to prevent the constant current "I" which is to be output from fluctuating due to influence of temperature.

Since the relay circuit 24, the low-pass filter circuit 26 and the A/D converting circuit 27 have functions similar to those of the first embodiment, these components are given the same numerical references as those of the first embodiment to omit explanations about the components.

Although the microcomputer 40 figures out the resistance value $R_L$ and the temperature $T_L$ of the coil 16 by program processing, similar to the first embodiment, the microcomputer 40 has a multiplier 47 for calculating the resistance value $R_L$ of the coil 16 instead of the reciprocal transforming portion 41 and the multiplier 43 of the first embodiment. The multiplier 47 multiplies a voltage value Vr (direct voltage Vr on the both ends of the coil 16) input from the A/D converting circuit 27 by a reciprocal 1/I of the predetermined constant current value "I" output from the constant current source circuit 52, and supplies the multiplied result Vr/I to the multiplier 43. Since the multiplier 43, the subtracting portion 44 and the comparison portion 45 are the same as those of the first embodiment, these components are given the same numerical references as those of the first embodiment to omit explanations about the components.

The behavior of the second embodiment configured as above will be explained. In the second embodiment as well, an audio signal which corresponds to the musical performance played with the keyboard 11 and the pedal 12 and is supplied from the tone generator 14 is fed into the coil 16 via the capacitor 51, so that the sound board 38 is vibrated by the audio signal. In this case, the constant current "I" output from the constant current source circuit 52 is direct so that the reproduction of the audio signal will not be affected. Furthermore, the constant current "I" is low in order to save power consumption. Therefore, the constant current "I" does not affect vibration of the sound board 38, so that favorable musical tone brought about by the vibration of the sound board 38 can be generated in a softened tone.

The direct current "I" supplied from the constant current source circuit 52 is also fed into the coil 16, while the low-pass filter circuit 26 removes alternating component (audio signal) to supply DC component of the voltage on the both ends of the coil 16, that is, the direct voltage Vr on the both ends of the coil 16 related only to the direct current I supplied from the constant current source circuit 52 to the A/D converting circuit 27. The A/D converting circuit 27 converts the supplied direct voltage Vr from analog to digital, and supplies the converted direct voltage value Vr to the microcomputer 40.

In the microcomputer 40, the multiplier 47 multiplies the supplied direct voltage value Vr by a constant 1/I indicative of a reciprocal of the magnitude of the predetermined constant current "I" output from the constant current source circuit 52, and supplies the multiplied result Vr/I to the multiplier 43 and the subtracting portion 44. In this case, the correlation between the resistance value $R_L$ of the coil 16, the direct current "I" output from the constant current source circuit 52 and fed into the coil 16, and the terminal voltage Vr of the coil 16 resulting from the direct current "I" is expressed by an equation 7 given below.

$$R_L = Vr/I \qquad \text{equation 7}$$

Therefore, the result Vr/I multiplied by the multiplier 47 is the resistance value $R_L$ of the coil 16. As a result, the resistance value $R_L$ of the coil 16 is obtained.

By use of the obtained resistance value $R_L$ of the coil 16, furthermore, the multiplier 43 and the subtracting portion 44 figure out the temperature $T_L$ (=260·$R_L$/R25.5−234.5=260·Vr/I·R25.5−234.5) of the coil 16, similarly to the case of the first embodiment. Furthermore, the calculated temperature $T_L$ of the coil 16 is compared with the predetermined upper limit temperature $T_{up}$ at the comparison portion 45 to be used for the control of the on/off state of the relay circuit 24, as in the case of the first embodiment.

In the second embodiment as well, as explained above, in the state where the temperature $T_L$ of the coil 16 is smaller than the upper limit temperature $T_{up}$, the relay circuit 24 is controlled to be the on-state, so that the audio signal supplied from the tone generator 14 is fed into the coil 16 of the transducer 30. In this case, since the direct current "I" supplied by the constant current source circuit 52 does not affect the reproduction of the audio signal, a favorable musical tone by the vibration of the sound board 38 is generated in a softened tone.

The terminal voltage Vr of the coil 16 resulting from the direct current "I" output from the constant current source circuit 52 to be fed into the coil 16 is extracted by the low-pass filter circuit 26, so that the extracted terminal voltage Vr is converted to a voltage value Vr by the A/D converting circuit 27 to be supplied to the microcomputer 40. The microcomputer 40 then figures out the resistance value $R_L$ and the temperature $T_L$ of the coil 16 by the processing done by the multipliers 47 and 43, and the subtracting portion 44. According to the second embodiment as well, as a result, the resistance value $R_L$ and the temperature $T_L$ of the coil 16 can be accurately measured by the simple configuration while musical tones are kept being generated.

According to the second embodiment as well, furthermore, if the temperature $T_L$ of the coil 16 is equal to or higher than the upper limit temperature $T_{up}$, the relay circuit 24 is controlled to be the off-state by the control of the comparison portion 45 and the relay circuit 24, so that the coil 16 is not be energized. According to the second embodiment as well, therefore, energization of the coil 16 is canceled to avoid rise in temperature caused by the energization of the coil 16. Resultantly, abnormal conditions of the coil 16 and its peripheral devices, and burnout of the coil 16 and its peripheral devices can be avoided, so that the piano according to the second embodiment can be effectively protected. In this embodiment as well, therefore, the relay circuit 24 serves as protecting means for protecting the coil 16 and its peripheral devices.

c. Modifications

Furthermore, embodiments of the present invention are not limited to the first and second embodiments, and can be modified variously without departing from the object of the invention.

Figure 4:
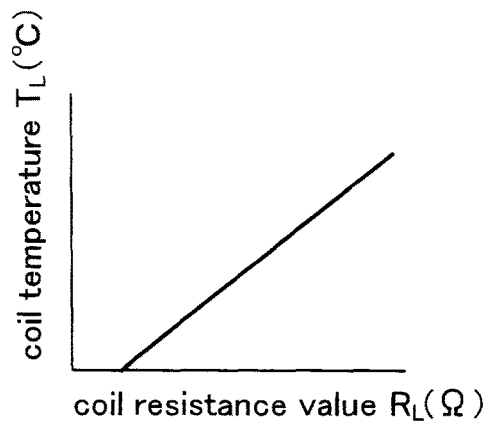
FIG. 4 is a diagram showing characteristics indicative of the correlation between resistance value of a coil and temperature of the coil.

The first embodiment is designed such that the microcomputer 40 receives the terminal voltage Vr of the resistor R via the low-pass filter circuit 26 and the A/D converting circuit 27 to figure out the resistance value $R_L$ of the coil 16 in accordance with the voltage value Vr by the processing done by the reciprocal transforming portion 41 and the multiplier 42 and to figure out the temperature of the coil 16 in accordance with the calculated resistance value $R_L$ by the processing done by the multiplier 43 and the subtracting portion 44. Instead of the first embodiment, however, a conversion table indicative of the correlation between the resistance value $R_L$ and the temperature $T_L$ of the coil 16 shown in FIG. 4 may be provided so that the calculated resistance value $R_L$ can be converted to the temperature $T_L$ by use of the provided conversion table to obtain the temperature $T_L$, instead of the processing by the multiplier 43 and the subtracting portion 44. For the calculation of the resistance value $R_L$ on the basis of the voltage value Vr, furthermore, a conversion table for converting from the voltage value Vr to the resistance value $R_L$ may be provided so that the input voltage value Vr can be converted to the resistance value $R_L$ by use of the provided conversion table to obtain the resistance value $R_L$, instead of the processing by the reciprocal transforming portion 41 and the multiplier 42. Furthermore, a conversion table for converting the voltage value Vr to the temperature $T_L$ may be provided so that the input voltage value Vr can be directly converted to the temperature $T_L$ by use of the provided conversion table to obtain the temperature $T_L$, instead of the processing by the reciprocal transforming portion 41, the multipliers 42 and 43, and the subtracting portion 44.

Furthermore, the second embodiment is designed such that the microcomputer 40 receives the terminal voltage Vr of the coil 16 via the low-pass filter circuit 26 and the A/D converting circuit 27 to figure out the resistance value $R_L$ of the coil 16 in accordance with the voltage value Vr by the processing done by the multiplier 47 and to figure out the temperature of the coil 16 in accordance with the calculated resistance value $R_L$ by the processing done by the multiplier 43 and the subtracting portion 44. Instead of the second embodiment, however, the conversion table indicative of the correlation between the resistance value $R_L$ and the temperature $T_L$ of the coil 16 shown in FIG. 4 may be provided so that the calculated resistance value $R_L$ can be converted to the temperature $T_L$ by use of the provided conversion table to obtain the temperature $T_L$, instead of the processing of the multiplier 43 and the subtracting portion 44. For the calculation of the resistance value $R_L$ on the basis of the voltage value Vr as well, furthermore, a conversion table for converting from the voltage value Vr to the resistance value $R_L$ may be provided so that the input voltage value Vr can be converted to the resistance value $R_L$ by use of the provided conversion table to obtain the resistance value $R_L$, instead of the processing by the multiplier 47. Furthermore, a conversion table for converting the voltage value Vr to the temperature $T_L$ may be provided so that the input voltage value Vr can be directly converted to the temperature $T_L$ by use of the provided conversion table to obtain the temperature $T_L$, instead of the processing by the multipliers 47 and 43, and the subtracting portion 44.

Instead of calculating the resistance value $R_L$ and the temperature $T_L$ of the coil 16 by the microcomputer 40 as described above, the resistance value $R_L$ and the temperature $T_L$ may be figured out by an analog circuit. In this case, for the first embodiment, an analog circuit formed of a reciprocal transforming circuit, multiplying circuits and a subtracting circuit which have the same functions as the reciprocal transforming portion 41, the multipliers 42 and 43, and the subtracting portion 44, respectively, may be employed, instead of the reciprocal transforming portion 41, the multipliers 42 and 43, and the subtracting portion 44. For the second embodiment, an analog circuit formed of multiplying circuits and a subtracting circuit having the same functions as the multipliers 47 and 43, and the subtracting portion 44 may be employed, instead of the multipliers 47 and 43, and the subtracting portion 44. In these cases, the A/D converting circuit 27 connected to the input side of the microcomputer 40 is unnecessary. Furthermore, the comparison portion 45 provided in the microcomputer 40 in the first and second embodiments may be replaced with an analog comparison circuit.

Furthermore, the first embodiment is designed such that the relay circuit 24, that is, the relay switch serving as the protection means for allowing or interrupting energization of the coil 16 for transmission of an audio signal to the coil 16 is provided to follow the amplifier circuit 15 in order to prevent excessive rise in the temperature $T_L$ of the coil 16. Instead of the relay circuit 24 serving as the protection means, however, an electronic switch circuit composed of a transistor or the like may be provided so that the electronic switch circuit is controlled by the microcomputer 40 to switch between on and off. Furthermore, since the relay circuit 24 or the electronic switch circuit serving as the protection means controls whether transmission of an audio signal to the coil 16 is allowed or interrupted, the relay circuit 24 or the electronic switch circuit may be provided anywhere as long as the relay circuit 24 or the electronic switch circuit is placed on a path through which an audio signal is transmitted to the coil 16. More specifically, the relay circuit 24 or the electronic switch circuit may be provided between the tone generator 14 and the high-pass filter circuit 22, between the high-pass filter circuit 22 and the adding circuit 23, or between the adding circuit 23 and the amplifier circuit 15.

Figure 5:
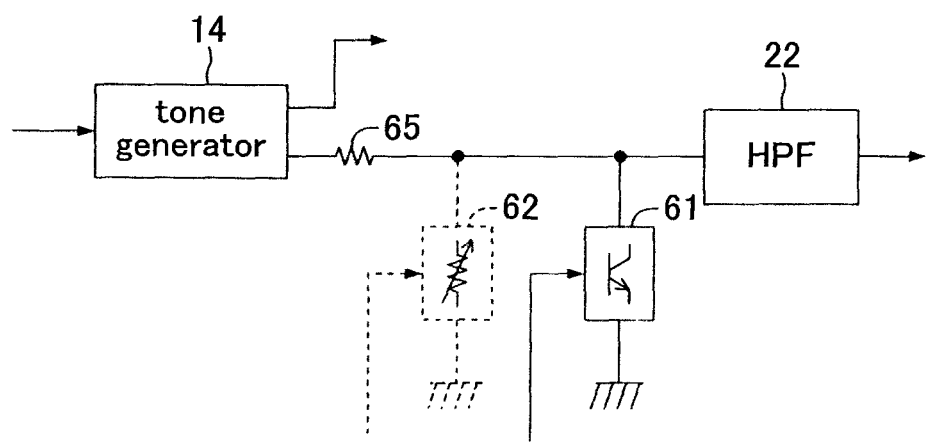
FIG. 5 is a schematic block diagram showing an electronic circuit of a modified part according to a modification of the first embodiment.

For the first embodiment, furthermore, instead of the relay circuit 24 or the electronic switch circuit, an electronic switch circuit 61 which is normally on an off-state may be provided between a line connecting between the tone generator 14 and the high-pass filter circuit 22, and a ground as indicated in FIG. 5 so that in a case where the temperature $T_L$ of the coil 16 is equal to or greater than the upper limit temperature $T_{up}$, the microcomputer 40 turns on the electronic switch circuit 61 to interrupt the energization of the coil 16 for transmission of an audio signal. In this case, a resistor 65 is inserted between the tone generator 14 and a terminal of the electronic switch circuit 61 on the tone generator side. Instead of the electronic switch circuit 61, furthermore, a relay circuit similar to the relay circuit (relay switch) 24 of the first embodiment may be used so that the microcomputer 40 keeps the relay circuit at the off-state in normal conditions, and turns the relay circuit to the on-state to interrupt the energization of the coil 16 for transmission of an audio signal if the temperature $T_L$ of the coil 16 is equal to or greater than the upper limit temperature $T_{up}$. In these modifications, furthermore, the electronic switch circuit 61 or the relay circuit may be placed between the line connecting between the high-pass filter circuit 22 and the adding circuit 23, and the ground, between the line connecting between the adding circuit 23 and the amplifier circuit 15, and the ground, or between the line connecting between the amplifier circuit 15 and the coil 16, and the ground.

Instead of the above-described electronic switch circuit 61 or the relay circuit, furthermore, an electronic volume may be used. In this case, as indicated by broken lines in FIG. 5, for example, an electronic volume 62 may be provided between the line connecting between the tone generator 14 and the high-pass filter circuit 22, and the ground. In this case as well, the resistor 65 is inserted between the tone generator 14 and a terminal of the electronic volume 62 on the tone generator side. The electronic volume 62 is to be controlled by the microcomputer 40 such that the electronic volume 62 is kept at the maximum volume in a state where the temperature $T_L$ of the coil 16 has not reached the upper limit temperature $T_{up}$, while in a state where the temperature $T_L$ of the coil 16 is equal to or greater than the upper limit temperature $T_{up}$, the volume value is reduced to decrease the amount of energization of the coil 16 for transmission of an audio signal. According to this modification as well, by the electronic volume 62 serving as the protection means, excessive rise in the temperature $T_L$ of the coil 16 can be avoided, so that abnormal conditions of the coil 16 and its peripheral devices, and burnout of the coil 16 and its peripheral devices can be avoided. In this modification as well, furthermore, the electronic volume 62 may be placed between the line connecting between the high-pass filter circuit 22 and the adding circuit 23, and the ground, between the line connecting between the adding circuit 23 and the amplifier circuit 15, and the ground, or between the line connecting between the amplifier circuit 15 and the coil 16, and the ground.

In the above-described modifications of the first embodiment, furthermore, in a case where the relay circuit 24, the electronic switch circuit 61, the electronic volume 62 or the like is used as the protection means, with the protection means being placed at a closer position to input side of an audio signal than the adding circuit 23, the direct voltage Vo supplied from the constant voltage source circuit 21 is applied to the coil 16 in spite of interruption of the energization of the coil 16 for transmission of an audio signal. In this case, therefore, the measurement of the temperature $T_L$ of the coil 16 is possible even after the interruption of energization of the coil 16 for transmission of an audio signal. After the temperature $T_L$ of the coil 16 is decreased by the interruption of energization of the coil 16 for transmission of an audio signal, the energization of the coil 16 for transmission of an audio signal can be recovered in accordance with the temperature $T_L$ of the coil 16 measured after the interruption.

Figure 6:
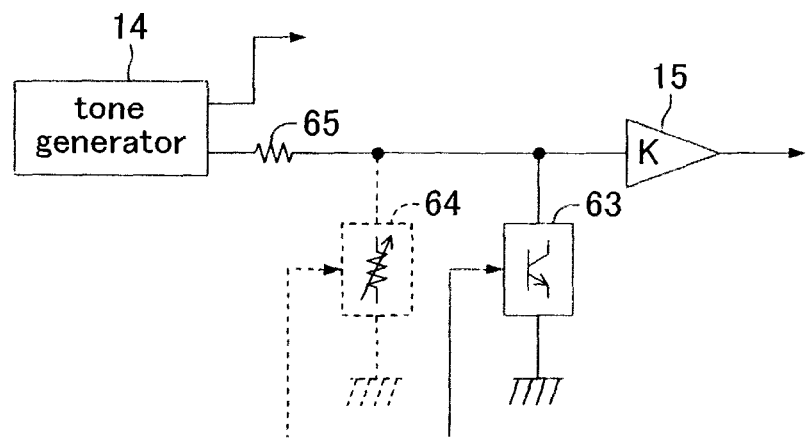
FIG. 6 is a schematic block diagram showing an electronic circuit of a modified part according to a modification of the second embodiment.

Furthermore, the second embodiment is also designed such that the relay circuit 24, that is, the relay switch serving as the protection means for allowing or interrupting energization of the coil 16 for transmission of an audio signal to the coil 16 is provided to follow the amplifier circuit 15 in order to prevent excessive rise in the temperature $T_L$ of the coil 16. In the second embodiment as well, however, instead of the relay circuit 24 serving as the protection means, the electronic switch circuit explained as the modification of the first embodiment may be used. In this case as well, furthermore, the relay circuit 24 or the electronic switch circuit may be placed between the tone generator 14 and the amplifier 15. Furthermore, the second embodiment may also be modified such that, instead of the relay circuit 24 or the electronic switch circuit, an electronic switch circuit 63 which is similar to the electronic switch circuit 61 explained as the modification of the first embodiment is provided between the line connecting between the tone generator 14 and the amplifier 15, and the ground, as indicated in FIG. 6. In this case as well, the resistor 65 is inserted between the tone generator 14 and the terminal of the electronic switch circuit 63 on the tone generator side.

Furthermore, the modifications of the second embodiment may be also modified to use the relay circuit or the electronic volume 64 (shown by broken lines in FIG. 6) explained as the modification of the first embodiment, instead of the electronic switch circuit 63. In this case as well, the resistor 65 is inserted between the tone generator 14 and the terminal of the electronic volume 64 on the tone generator side. Furthermore, the electronic switch circuit 63, the relay circuit or the electronic volume 64 may be provided between the line connecting between the amplifier 15 and the capacitor 51, and the ground.

In the second embodiment, as described above, in a case where the relay circuit 24, the electronic switch circuit 63, or the electronic volume 64 is used as the protection means, since the direct current I supplied from the constant current source circuit 52 is always fed into the coil 16, the measurement of the temperature $T_L$ of the coil 16 is possible even after the interruption of energization of the coil 16 for transmission of an audio signal. In these cases, therefore, after the temperature $T_L$ of the coil 16 is decreased by the interruption of energization of the coil 16 for transmission of an audio signal, the energization of the coil 16 for transmission of an audio signal can be recovered in accordance with the temperature $T_L$ of the coil 16 measured after the interruption.

Furthermore, the first and second embodiments are designed such that an audio signal output from the tone generator 14 is supplied to the coil 16 of the one transducer 30, so that the sound board 38 is vibrated by the one transducer 30. However, the first and second embodiments may be modified such that an audio signal output from the tone generator 14 is supplied to respective coils of a plurality of transducers, so that the sound board 38 is vibrated by the transducers.

Furthermore, the first and second embodiments are designed such that the present invention is applied to a piano. However, the invention can be also applied to electronic musical instruments which do not normally have a sound board but are provided with a sound board vibrated by an audio signal so that the newly provided sound board is vibrated by the transducer 30. Furthermore, the invention can be also applied to a sound signal converting apparatus for converting audio signals to sound signals not by the vibration of the sound board but by a speaker which vibrates a vibrating member such as a cone paper by energization of a voice coil. In this case, the coil 16 of the first and second embodiments may be employed as the voice coil of the speaker.

Furthermore, the first and second embodiments are designed such that audio signals are generated by the tone generator 14 in accordance with musical operation on the keyboard 11 and the pedal 12. However, the first and second embodiments may be modified such that audio signals are generated by the tone generator 14 in accordance with musical operation of a musical performance operating element other than the keyboard 11 and the pedal 12. Furthermore, audio signals may be generated by the tone generator 14 in accordance with previously stored musical performance data. Furthermore, the present invention can be applied not only to musical instruments but also to various kinds of sound signal converting apparatuses as long as the sound signal converting apparatuses can convert an audio signal to a sound signal by use of a transducer, a speaker or the like. Even without the tone generator 14, more specifically, the sound signal converting apparatuses may convert a recorded audio signal to a sound signal by directly supplying the audio signal to the transducer, the speaker or the like.

What is claimed is:

1. A protection apparatus for a sound signal converting device, the protection apparatus comprising:
 a temperature measurement apparatus for a sound signal converting device having a coil and converting an electric signal to a sound signal by energizing the coil, the temperature measurement apparatus measuring temperature of the coil and comprising:
  a constant voltage source circuit connected to an input side of the coil to apply a DC voltage having a predetermined voltage value to the coil;
  a current value extracting circuit connected to the coil to extract a signal indicative of a value of direct current passing through the coil; and
  a processor configured to receive the signal extracted by the current value extracting circuit, and determine the temperature of the coil based on the direct current value and the predetermined voltage value; and
 a protection circuit configured to interrupt energization of the coil for transmission of an electric signal or decrease an amount of energization of the coil for transmission of the electric signal when the temperature of the coil determined by the processor becomes equal to or greater than a predetermined temperature.

2. The protection apparatus according to claim 1, wherein the temperature measurement apparatus further comprises a high-pass filter circuit connected to the coil, with the high-pass filter circuit being disposed closer to an input side than a position at which the constant voltage source circuit is connected to the coil, the high-pass filter circuit being provided to interrupt a DC component included in the electric signal to be input.

3. The protection apparatus according to claim 1, wherein the processor is configured to execute:
 a resistance value calculating task that calculates a resistance value of the coil using the signal extracted by the current value extracting circuit and the predetermined voltage value; and
 a temperature converting task that converts the resistance value calculated by the resistance value calculating task to a temperature of the coil.

4. The protection apparatus according to claim 1, wherein the current value extracting circuit comprises:
 a resistor connected in series with the coil to sense current; and
 a low-pass filter circuit connected at a position where the coil is connected with the resistor.

5. A protection apparatus for the sound signal converting device, the protection apparatus comprising:
 a temperature measurement apparatus for a sound signal converting device having a coil and converting an electric signal to a sound signal by energizing the coil, the temperature measurement apparatus measuring temperature of the coil and comprising:
  a constant current source circuit connected to the coil to feed a direct current having a predetermined current value to the coil;

a voltage value extracting circuit connected to the coil to extract a signal indicative of a value of DC voltage applied to the coil; and a processor configured to receive the signal extracted by the voltage value extracting circuit, and determine the temperature of the coil based on the DC voltage value and the predetermined current value; and a protection configured to interrupt energization of the coil for transmission of an electric signal or decrease an amount of energization of the coil for transmission of the electric signal when the temperature of the coil determined by the processor becomes equal to or greater than a predetermined temperature.

6. The protection apparatus according to claim 5, wherein the temperature measurement apparatus further comprises a high-pass filter circuit connected to an input side of the coil to interrupt a DC component included in the electric signal to be input.

7. The protection apparatus according to claim 5, wherein the processor is configured to execute:

a resistance value calculating task that calculates a resistance value of the coil using the signal extracted by the current value extracting circuit and the predetermined voltage value; and a temperature converting task that converts the resistance value calculated by the resistance value calculating task to a temperature of the coil.

8. The protection apparatus according claim 5, wherein:

the constant current source circuit is connected in parallel with the coil, and the voltage value extracting circuit is composed of a low-pass filter circuit connected at a position where the constant current source circuit is connected with the coil.

* * * * *